Oct. 29, 1935.   R. M. COOPER ET AL   2,019,073
CLUTCH MECHANISM
Filed Dec. 30, 1931
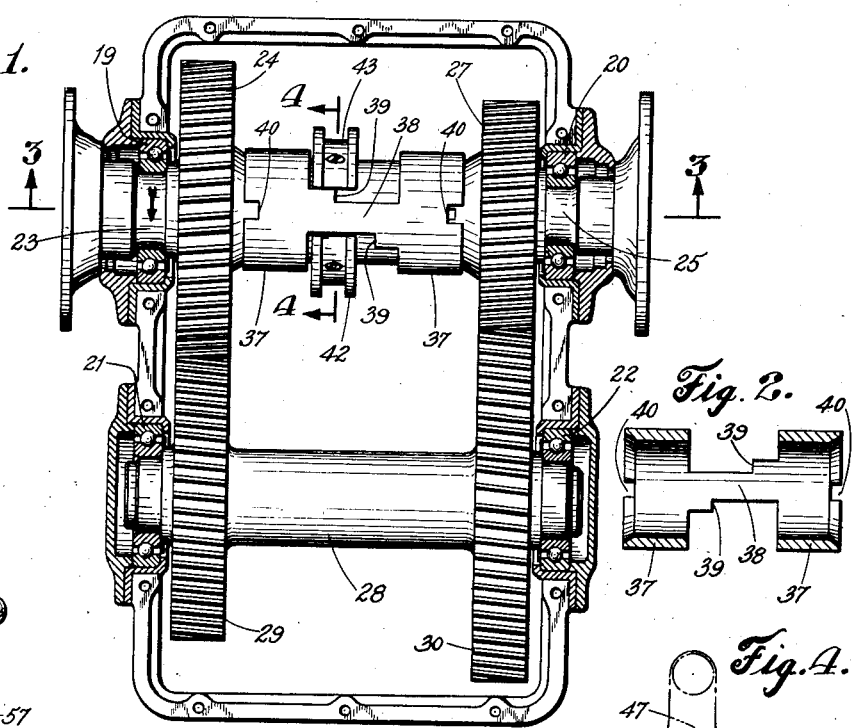
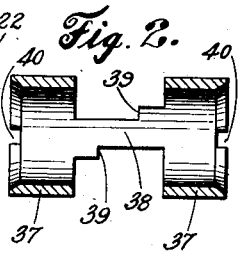
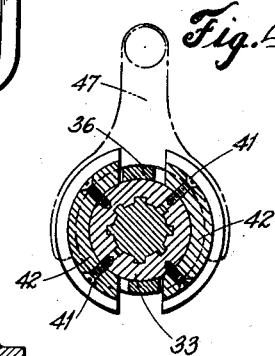
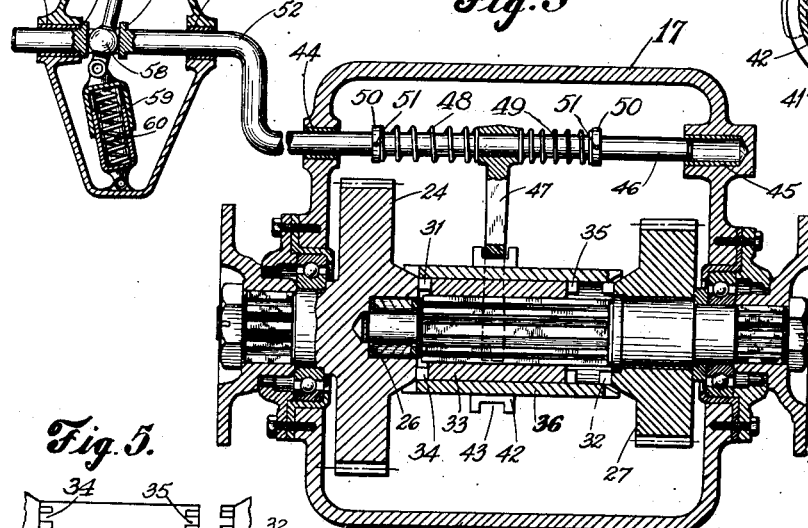
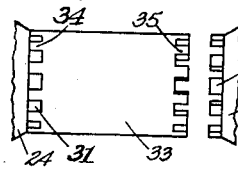
INVENTORS
R. M. Cooper
W. R. Spiller Patented Oct. 29, 1935

2,019,073

UNITED STATES PATENT OFFICE 2,019,073

CLUTCH MECHANISM

Rolland M. Cooper and William R. Spiller, Cleveland, Ohio, assignors to The White Motor Company, Cleveland, Ohio, a corporation of Ohio Application December 30, 1931, Serial No. 583,894

2 Claims. (Cl. 192—53)

This invention relates to clutch mechanisms for use in change speed mechanisms.

It is an object of this invention to provide a simple and efficient clutch mechanism for use in a change speed mechanism of a pre-selective type.

It is a further object of this invention to provide a clutch mechanism for a change speed mechanism which can be actuated with facility to effect a change in speed in the mechanism driven by the change speed mechanism without disconnecting the change speed mechanism from the mechanism driven thereby or from the mechanism which drives it.

It is a further object of this invention to provide a clutch mechanism for a change speed mechanism which embodies means for preventing the establishment of a driving connection effecting a speed change until after the parts to be connected have been brought into substantial synchronism.

Other objects and attendant advantages will appear in the following description, when read in connection with the accompanying drawing, in which:

Figure 1 is a top plan view of a gear box for an automobile constructed with a clutch mechanism embodying the present invention, the upper part of the casing of the gear box being removed so as to show the internal mechanism.

Figure 2 is a longitudinal sectional view of a sleeve first illustrated in Figure 1, the section being taken through the axis of the sleeve at an angle to show the parts of the sleeve hidden in Figure 1.

Figure 3 is a composite view consisting of a vertical section of the gear box taken on a line corresponding with line 3—3 of Figure 1, and a vertical section of a forwardly disposed shifting mechanism taken through the central axis of such mechanism.

Figure 4 is a vertical section taken on line 4—4 of Figure 1, certain parts falling within the section but not shown in Figure 1 being shown in dot and dash lines, and Figure 5 is a diagrammatic view showing the shape and relation of the teeth formed on three associated parts of the change speed mechanism, the parts being illustrated in the same relation as in Figure 3.

The gear box illustrated in the drawing comprises a casing consisting of an upper section 17 and a lower section 18. Mounted in apertures composed of semi-circular recesses formed in the end walls of the sections 17 and 18, there are two sets of axially aligned anti-friction bearings, a left hand set as viewed from the forward end of the gear box consisting of a forward bearing 19 and a rearward bearing 20, and a right hand set as viewed from the same position consisting of a forward bearing 21 and a rearward bearing 22. Journalled in the bearing 19 there is a driven shaft 23 formed at its rear end with a gear wheel 24. Mounted within the bearing 20, there is a shaft 25 the forward end of which is supported in an anti-friction bearing 26 mounted in a recess formed in the rear end of the shaft 23; and mounted upon the shaft 25 for relative rotation with respect thereto, there is a gear wheel 27 of a smaller pitch diameter than the gear wheel 24. Journalled within the bearings 21 and 22, there is a countershaft 28 formed with gear wheels 29 and 30 which mesh respectively with gear wheels 24 and 27.

The gears 24 and 27 are formed with opposed sets of rectangular shaped clutch teeth 31 and 32 respectively; and splined upon the shaft 25 between the gears 24 and 27 there is a sleeve 33 formed at its opposite ends with rectangular shaped teeth 34 and 35 designed to mesh respectively with the teeth 31 and 32 of the gears 24 and 27, the sleeve being of such length that when it occupies a position midway between the gears 24 and 27 the teeth at its opposite ends are out of engagement with the teeth 31 and 32 of the gears. Slidably and rotatably mounted upon the sleeve 33 there is a second sleeve 36 so designed and coordinated with the gear wheels 24 and 27 as to have but a slight endwise movement. This sleeve comprises cylindrical end portions 37 formed with beveled end surfaces designed to engage with like surfaces on the gears 24 and 27, and an intermediate pair of diametrically spaced, longitudinally extending, S-shaped members 38 formed on their opposite sides with longitudinally spaced shoulders 39. The cylindrical portions 37 are formed at their outer end with slots 40 which act during shifting of the sleeve 33, as hereinafter described, to facilitate the removal of lubricant from between the beveled end surfaces of the portions 37 and the corresponding surfaces of the gears 24 and 27.

Secured to the sleeve 33 by means of screws 41, and located between the S-shaped portions 38 of the sleeve 36, there is a pair of arcuate members 42 disposed in circular alignment and formed with aligned grooves 43, the ends of such members being spaced apart a slightly greater distance than that required to permit the broad sections of the S-shaped portions 38 to slide therebetween. These arcuate members are designed to engage with the shoulders 39, as hereinafter described, to force the sleeve 36 into frictional engagement with the gears 24 and 27, and are so constructed and arranged that, when they are moved into engagement with the shoulders 39, the sleeve 33 is moved to a position midway between the gears 24 and 27 with its teeth out of engagement with the teeth of both such gears.

Successful operation of the speed change mechanism is dependent upon the condition that a greater amount of friction be set up between the sleeve 36 and the gears 24 and 27 than is set up between the members 42 and the shoulder 39, when the former parts are forced into engagement by engagement of the latter part as above described; and it is to this end, that the sleeve 36 and the gears 24 and 27 are formed with beveled surfaces to increase the friction between such parts, and the sleeve 36 formed with slots 40 to facilitate the removal of lubricant from between the beveled surfaces of such parts.

Slidably mounted in bearings 44 and 45 in the upper section 17 of the transmission casing, there is a rod 46; and supported upon this rod there is a shifter fork 47, the lower forked end of which straddles the shaft 25 and extends into the grooves 43 in the members 42. The shifter fork 47 is slidably mounted upon the rod 46 between two springs 48 and 49 of equal strength, placed under compression, and held against longitudinal movement with respect to the rod 46 by collars 50 secured in position by pins 51.

The rod 46 extends through the forward end of the upper section 17 of the transmission casing, and is connected with a forwardly extending rod 52 which extends into the casing 53 of an auxiliary shifting unit. The rod 52 is slidably supported in bearings 54 mounted in the side walls of the casing, and is formed within the casing with shoulders 55 and 56 designed for engagement with the side walls of the casing to limit backward and forward movement thereof.

Pivotally mounted in the upper end of the casing 13 by means of a ball and socket construction, there is a manually operated lever 57 for shifting the rods 52 and 46. This lever extends through a slot formed in the rod 52 between the shoulders 55 and 56, and is formed within the slot with a circular enlargement 58 which engages the end walls of the slot to form a pivotal connection of the sliding type.

Pivotally connected to the bottom of the casing 53, and to the lower end of the lever 57 below the rod 52, there is a spring operated mechanism consisting of a telescopic two-part casing 59 and an internally mounted spring 60 of relatively great strength placed under compression in assembly. This spring operated mechanism is so coordinated with the lever 57 as to urge further inclination of the lever when inclined from a vertical position, and is so designed as to render it substantially impossible for the lever to occupy an intermediate position between the position shown and an alternate position with the shoulder 55 of the rod 52 engaging the side wall of the casing 53, unless the lever is held in such a position.

The shifting mechanism just described in the preceding three paragraphs is so coordinated with the sleeves 33 and 36, and the sleeves 33 and 36 so constructed, that whenever the parts occupy a position as illustrated in Figure 3, or an alternate position with the lever 57 in a forward position and the sleeve 33 in engagement with the gear 27, the sleeve 33 is held in position by a difference in the pressures of the springs 48 and 49 with the ends of its teeth engaging the surfaces between the teeth of the respective gears.

In installing the gear box just described within an automobile, the shaft 23 is connected with a mechanism forming a driving connection between it and the engine of the automobile, and the shaft 25 with mechanism for transmitting motion to the traction wheels of the automobile. In operation, the engine of the automobile drives the shaft 23 which is caused to rotate in the direction indicated by arrows in the drawing for forward motion of the vehicle, and in the reverse direction for rearward motion of the vehicle. With the sleeve 33 occupying the position shown in the drawing, the drive from the engine is transmitted directly from the shaft 23 to the shaft 25 with no change in speed, the mechanism being in what is commonly known as direct drive. With the sleeve 33 occupying a position with its teeth 35 in mesh with the teeth 32 of the gear 27, the drive is transmitted through the gears 24 and 29 to the countershaft 28 and from the countershaft through the gears 30 and 27 to the shaft 25 with the result that the shaft 25 is driven at a higher rate of speed than the driving shaft 23. The mechanism is then in what is known as overspeed drive.

Assuming that the automobile is in forward motion and that the sleeve 33 and the lever 57 occupy the positions shown in Figure 3, the sleeve may be shifted to a position with its teeth 35 in mesh with the teeth 32 of the gear 27 by moving the lever 57 to a forward position in which the shoulder 55 on the rod 52 engages the side wall of the casing 53, and then decelerating the engine. As the lever 57 is moved forward the rods 52 and 46 are moved rearward reducing the pressure of the rearwardly disposed spring 49 on the fork 47, and increasing the pressure of the forwardly disposed spring 48 on such member, until at the end of the movement of the lever 57 the difference in pressure of the springs 48 upon the fork is such as to tend to move the fork and the sleeve 33 rearwardly. Rearward movement of the sleeve 33 and the fork 47 is prevented by the friction set up between teeth 31 of the sleeve 33 and the teeth 34 of the gear 24 in transmitting the drive, and as a result further movement of the parts of the shifting mechanism is delayed pending deceleration of the engine.

Upon deceleration of the engine, the pressure on the teeth 31 of the sleeve 33 and the teeth 34 of the gear 24 is removed, and the sleeve 33 is moved rearwardly by the greater pressure of the forwardly disposed spring 48 to a position where the ends of the members 42 engage the rear shoulders 39 of the S-shaped portion 38 of the sleeve 36, and the beveled end surface of the sleeve 36 has been forced into frictional engagement with the beveled surface of the gear 27.

Since the shaft 25 will be rotating at a slower speed than the gear 27 at the time the sleeve 33 is forced into frictional engagement with the gear 27, the sleeve 33 will tend to be rotated through its frictional engagement with the gear 27 at a more rapid rate than the shaft 25. As a result, the rear shoulders 39 of the S-shaped portions 38 of the sleeve 36 will be momentarily maintained in engagement with the ends of the members 42 holding the sleeve 33 against further rearward movement. As the engine continues to decelerate, the relative speeds of the shaft 25 and the gear 27 will be reversed, and the sleeve 36 will then be turned through its frictional engagement with the gear 27 to move the rear shoulder 39 of the S-shaped portions 38 out of engagement with the ends of the members 42. As soon as the members 42 have been moved out of engagement with the shoulders 39 of the S-shaped portion 38, the sleeve 33 will be moved rearward by the action of the forwardly disposed spring 48 bringing its teeth 35 into engagement with the teeth 32 of the gear 27.

Due to the fact that the members 42 are released from the rear shoulders 39 of the S-shaped portions 38 closely following the time at which the speed of the sleeve 33 is exactly the same as that of the gear 27, i. e., closely following the reversal of the relative speed of the shaft 25 and the gear 27, the sleeve 33 will be turning at but a slightly greater rate of rotation than the gear 27 at the time its teeth are brought into engagement with the teeth 32 of the gear 27. As a result, the teeth 35 of the sleeve 33 will go quietly into mesh with the teeth 32 of the gear 27 without subjecting the connected parts to excessive stress.

Assuming now that it is desired to re-establish direct drive, the lever 57 is moved rearwardly to the position illustrated, the engine decelerated, and then accelerated. The forward movement of the rod 46 produced by the rearward movement of the lever 57 decreases the pressure of the forwardly disposed spring 48 on the fork 47, and increases the pressure of the rearwardly disposed spring 49 on such member, until at the end of the movement the difference in pressures of the springs 48 and 49 upon the fork is such as to tend to produce forward movement of the fork and the sleeve 33. Forward movement of the sleeve 33 and the fork 47 is prevented, in an analogous manner to the corresponding movement in the previously described operation, by the friction set up between the teeth 35 of the sleeve 33 and the teeth 32 of the gear 27 in transmitting the drive.

Upon deceleration of the engine, the pressure on the teeth 35 of the sleeve 33 and the teeth 32 of the gear 27 is removed, and the sleeve 33 is moved forwardly by the greater pressure of the rearwardly disposed spring 49 to a position where the ends of the members 42 engage the forwardly disposed shoulders 39 of the S-shaped portions of the sleeve 36, and the beveled end surface of the sleeve 36 has been forced into frictional engagement with the corresponding surface of the gear 24.

Due to the fact that the shaft 25 will be rotating at a higher rate of speed than the gear 24 at the time the sleeve 36 is forced into frictional engagement with the gear 24, the friction set up between the gear 24 and the sleeve 36 will tend to retard the speed of rotation of the latter part, and in consequence thereof, the shoulders 39 of the S-shaped portions 38 of the sleeve 36 will be held in engagement with the ends of the members 42 preventing further forward movement of the sleeve 33. Following acceleration of the engine, the relative speeds of rotation of the gear 24 and the shaft 25 will be reversed, and the sleeve 36 will then be turned through its frictional engagement with the gear 24 to move the forward shoulders 39 of the S-shaped portions 38 out of engagement with the ends of the members 42; following which, the sleeve 33 will be moved forward by the action of the rearwardly disposed spring 49 bringing its teeth 31 into engagement with the teeth 34 of the gear 24.

Owing to the fact that the members 42 are released from the shoulders 39 of the S-shaped portions 38 closely following reversal of speeds of the shaft 25 and the gear 24, the sleeve 33 will be turning at but a slightly slower rate of speed than the gear 24 at the time its teeth 31 are brought into engagement with the teeth 34 of such gear. As a result, the teeth 31 of the sleeve 33 will go quietly into mesh with the teeth 34 of the gear 24 in an analogous manner to the manner in which the teeth 35 of the sleeve 33 enter into engagement with the teeth 32 of the gear 27 in shifting to overspeed drive.

Except during shifting which should be quickly performed without hesitation, the operating lever 57 should either occupy the position shown or the alternate position for overspeed drive. In case the lever 57 is retained in an intermediate position, it may happen that the conditions, at the time the lever is moved to one or the other of the above positions, will be such that the sleeve 33 is not retained in an intermediate position pending a reversal of its speed and the speed of the gear toward which it is urged, and that at the time the sleeve 33 is brought into engagement with the gear the difference in relative speeds will be such as to produce serious damage.

Should the lever 57 be shifted from one position to another while the automobile is standing still, and a drive established between the engine and the shaft 23 with the engine in operation, it will either result in the sleeve 33 being retained in a disconnected position between the gears 24 and 27 through engagement of the members 42 with the shoulders 39, or in the sleeve being moved into a position with its teeth in engagement with the teeth of the gear toward which it is urged before the shaft 23 has reached a speed of rotation capable of producing damage, the result being dependent upon the direction in which the shaft 23 is driven.

Although the foregoing description is necessarily of a detailed character, in order that the invention may be completely set forth, it is to be understood that the specific terminology is not intended to be restrictive or confining, and that various rearrangements of parts and structural details may be resorted to without departing from the spirit and scope of the invention.

We claim as our invention:

1. In a change speed device having a shaft, a large gear and a small gear mounted in co-axial relation with said shaft, and means operatively connecting said gears for simultaneous rotation at different speeds, a clutch mechanism comprising a sleeve slidably mounted upon said shaft between said gears and affixed upon said shaft for simultaneous rotation therewith, a set of teeth formed on one end of said sleeve designed for engagement with teeth on said large gear and a set of teeth formed on the other end of said sleeve designed for engagement with teeth on said small gear, said sleeve being so designed that when it occupies a position midway between said gears the teeth at its opposite ends are out of engagement with the teeth of both of said gears, a pair of spaced lugs on said sleeve, a member slidably and rotatably mounted on said sleeve, said member having a length greater than said sleeve and less than the distance between said gears, and being constructed with end portions designed for frictional engagement with said gears and with an intermediate portion which extends between said lugs, a laterally extending abutment formed on one side of the intermediate portion of said member which when said sleeve is moved by continuously acting force from an interlocked position with said large gear toward an interlocked position with said small gear is engaged by one of the lugs on said sleeve moving said member into frictional engagement with said small gear and which acting through engagement with the aforesaid lug stops and retains said sleeve in a position midway between said gears until after there has been a reversal of speeds of said shaft and said small gear acting through the frictional engagement set up between said member and said small gear to move the aforesaid lug out of engagement with said abutment, and a laterally extending abutment formed on the other side of the intermediate portion of said member designed to co-act with the other of said lugs in an analogous manner to that set up when said sleeve is moved by a continuously acting force from an interlocked position with said small gear toward an interlocked position with said large gear.

2. In a change speed device having a shaft, a large gear and a small gear mounted in co-axial relation with said shaft, and means operatively connecting said gears for simultaneous rotation at different speeds, a clutch mechanism comprising a sleeve slidably mounted upon said shaft between said gears and affixed upon said shaft for simultaneous rotation therewith, a set of teeth formed on one end of said sleeve designed for engagement with teeth on said large gear and a set of teeth formed on the other end of said sleeve designed for engagement with teeth on said small gear, said sleeve being so designed that when it occupies a position midway between said gears the teeth at its opposite ends are out of engagement with the teeth of both of said gears, a member slidably and rotatably mounted on said sleeve, said member having a length greater than said sleeve and less than the distance between said gears, and being constructed with end portions designed for frictional engagement with said gears, and means for guiding relative movement of said member and said sleeve whereby said member in moving between the limits of its longitudinal movement with respect to said sleeve is constrained at the ends of such movement to direct longitudinal movement and at an intermediate point to rotative movement in one direction, said means comprising mechanism carried by said sleeve which when said sleeve is moved by a continuously acting force from an interlocked position with one of said gears towards an interlocked position with the other of said gears is brought into engagement with abutting means on said member forcing said member into frictional engagement with the gear towards which said sleeve is moved, and which through being brought into engagement with said abutting means acts to stop and retain said sleeve in a position midway between said gears until after there has been a reversal of the speeds of said shaft and the gear towards which said sleeve is moved acting through the frictional engagement set up between said member and said last named gear to produce relative rotational movement of said sleeve and said member.

ROLLAND M. COOPER.
WILLIAM R. SPILLER.